F. TWYMAN, R. G. PARKER & A. J. DALLADAY.
JOINING TOGETHER GLASS SURFACES.
APPLICATION FILED MAY 23, 1916.
1,206,177.
Patented Nov. 28, 1916.
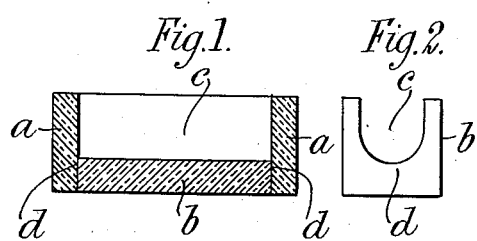
Inventors:
Frank Twyman
Reginald George Parker
Arthur James Dalladay
By their Attorney,
Baldwin & Wight

UNITED STATES PATENT OFFICE.

FRANK TWYMAN, REGINALD GEORGE PARKER, AND ARTHUR J. DALLADAY, OF LONDON, ENGLAND, ASSIGNORS TO ADAM HILGER, LIMITED, OF LONDON, ENGLAND.

JOINING TOGETHER GLASS SURFACES.

1,206,177.  Specification of Letters Patent.  Patented Nov. 28, 1916.

Application filed May 23, 1916. Serial No. 99,451.

*To all whom it may concern:*

Be it known that we, FRANK TWYMAN, REGINALD GEORGE PARKER, and ARTHUR JAMES DALLADAY, subjects of the King of Great Britain, residing at 75a Camden road, London, England, have invented new and useful Improvements in Joining Together Glass Surfaces, of which the following is a specification.

This invention relates to improvements in joining together glass surfaces and is especially applicable for use in the manufacture of prisms, lenses, cells and the like.

The object of the invention is to so join together glass surfaces that glass articles can be made in two or more parts without the use of cement and without distortion of any of the parts.

According to this invention glass surfaces to be joined together are carefully cleansed and are then placed together and submitted to a temperature which is insufficient to cause permanent distortion of the surfaces but sufficiently high to cause the surfaces to join together.

Preferably the surfaces of the parts to be joined together are of the same curvature and are so carefully cleansed that they can be put by slight pressure in optical contact; that is, that the contact is so intimate that there is no reflection of light at the intersurface. The parts thus prepared are held together by a pressure of about 15 lbs. per square inch and submitted to as high a temperature as possible that will not cause distortion of the glass to take place. The glass surfaces to be jointed together may be of the same description of glass (including silica glass) or may be of different descriptions.

By means of this invention polarimeter tubes and other tubes and cells for optical measurements of gases or liquids may be made without the use of cement and without impairing the optical properties of the parts of which they are made. Component parts of achromatic lenses may similarly be joined together without cement and without distortion of the separate elements. Prisms or lenses may similarly be built up of several pieces, and in the cases of prisms and lenses having faulty portions, these portions may be removed and replaced by other pieces of glass.

The drawings show a cell made in accordance with this invention.

Figure 1 is a longitudinal section and Fig. 2 an end view of a trough.

In the manufacture of an optical cell of a glass having a melting point of 1100° C. and an annealing point of 600° C., the cell being formed of two plane parallel plates of glass $a$ and a block of glass $b$ hollowed out to form a trough $c$, the ends $d$ of the trough are polished to render them flat and parallel to each other to within the accuracy desired. The two plane parallel plates $a$ and the ends $d$ of the trough are then carefully cleaned and the plates $a$ are placed in optical contact on the ends $d$ of the trough; the whole is then clamped together under a pressure of 15 lbs. to the square inch and is placed in a furnace the temperature of which is slowly raised to 500° to 520° C. and maintained at that temperature for two hours and then slowly cooled down. The three pieces will then have united to form an optical cell of the accuracy desired.

What we claim is:—

1. The process of joining together glass surfaces without distortion of any of the parts consisting in cleaning the surfaces, placing them together without the interposition of any substance whatever and then submitting them to a temperature which is insufficient to cause permanent distortion of the surfaces but sufficiently high to cause the surfaces to join together.

2. The process of joining together glass surfaces without distortion of any of the parts consisting in cleaning the surfaces, placing them together in optical contact without the interposition of any substances whatever and then submitting them to a temperature which is insufficient to cause permanent distortion of the surfaces but sufficiently high to cause the surfaces to join together.

3. The process of joining together glass surfaces consisting in cleaning the surfaces, placing them together in optical contact, submitting them to pressure and to a temperature which is insufficient to cause permanent distortion of the surfaces but sufficiently high to cause the surfaces to join together.

4. The process of joining together surfaces of a glass having a melting point of 1100° C. and an annealing point of 600° C., consisting in cleaning the surfaces, placing them together in optical contact, submitting them to pressure and to a temperature not exceeding 520° C.

5. The process of joining together glass surfaces consisting in cleaning the surfaces, placing them together, and then submitting them to the same temperature which is insufficient to cause permanent distortion of the surfaces but sufficiently high to cause the surfaces to join together.

6. The process of joining together glass surfaces consisting in cleaning the surfaces, placing them together in optical contact and then submitting them to the same temperature which is insufficient to cause permanent distortion of the surfaces but sufficiently high to cause the surfaces to join together.

FRANK TWYMAN.
REGINALD GEORGE PARKER.
ARTHUR J. DALLADAY.